April 13, 1954  H. A. THORNBURG  2,674,811
DRIER FOR POROUS MATERIALS
Filed Nov. 17, 1950  4 Sheets-Sheet 1
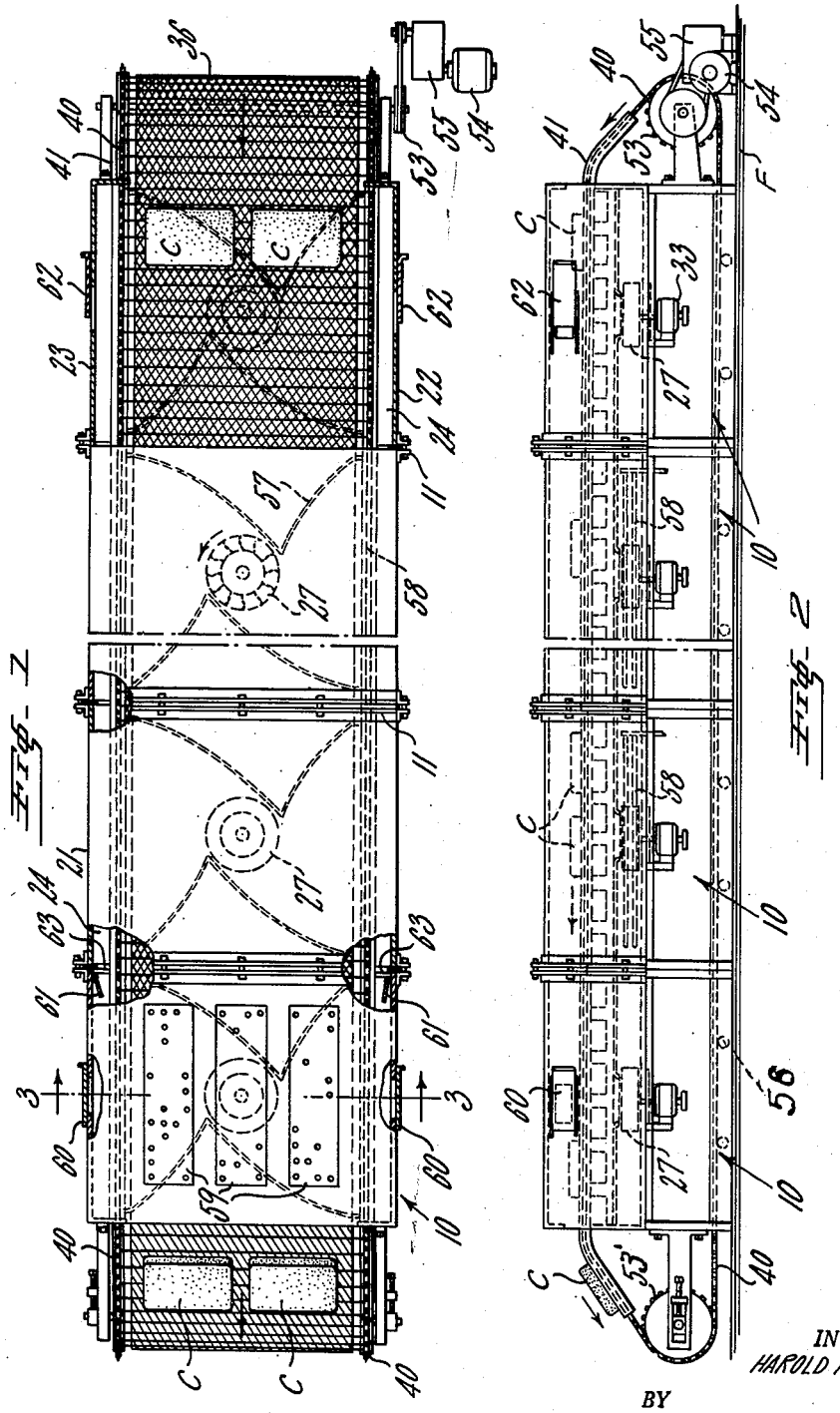
INVENTOR.
HAROLD A. THORNBURG
BY
Charles C. Willson
ATTORNEY April 13, 1954   H. A. THORNBURG   2,674,811
DRIER FOR POROUS MATERIALS
Filed Nov. 17, 1950   4 Sheets-Sheet 2
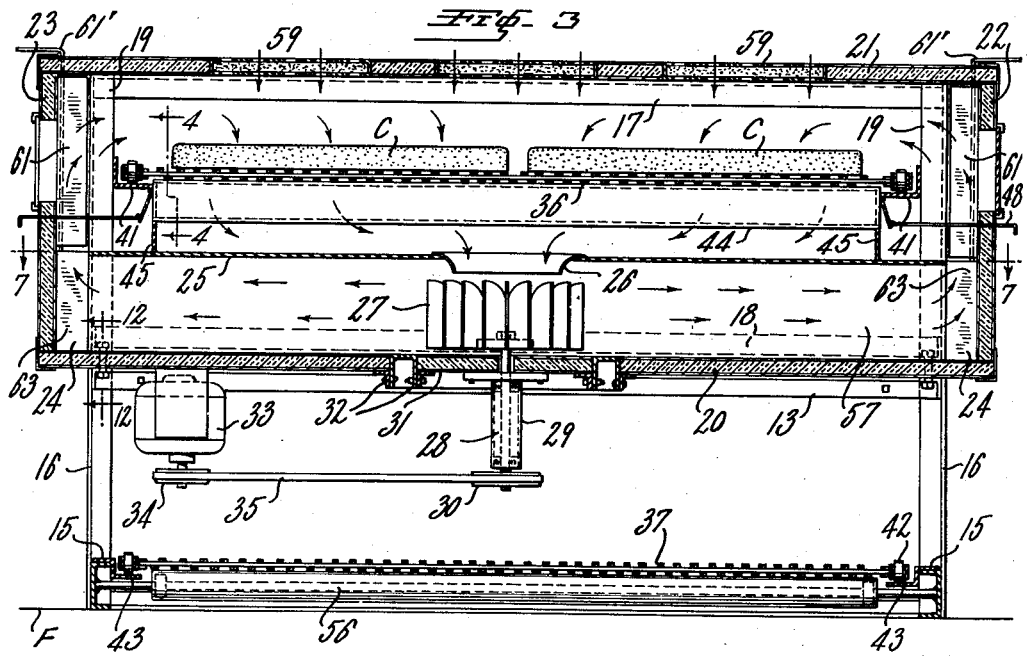
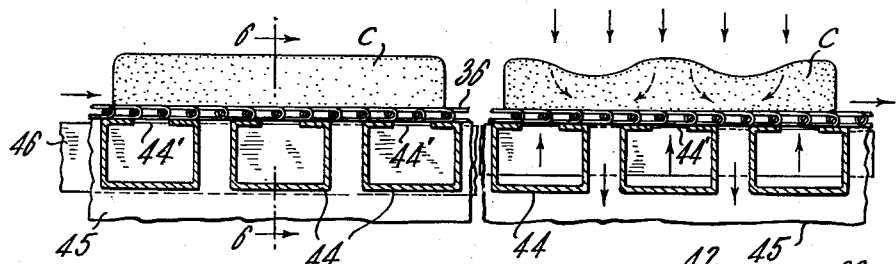
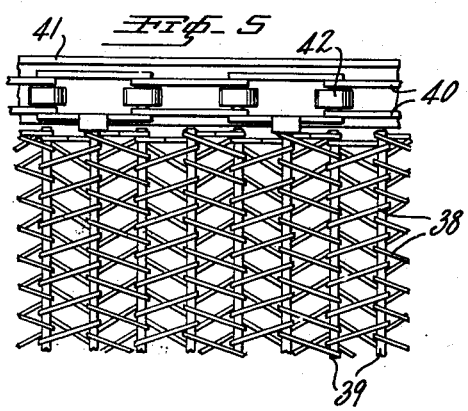
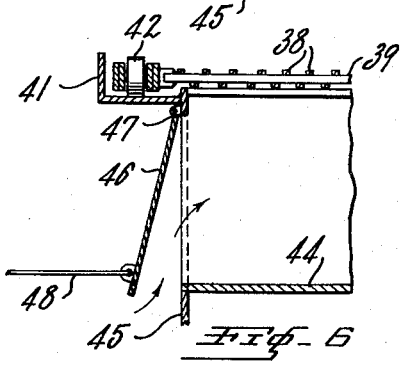
INVENTOR.
HAROLD A. THORNBURG
BY
Charles L. Willson
ATTORNEY

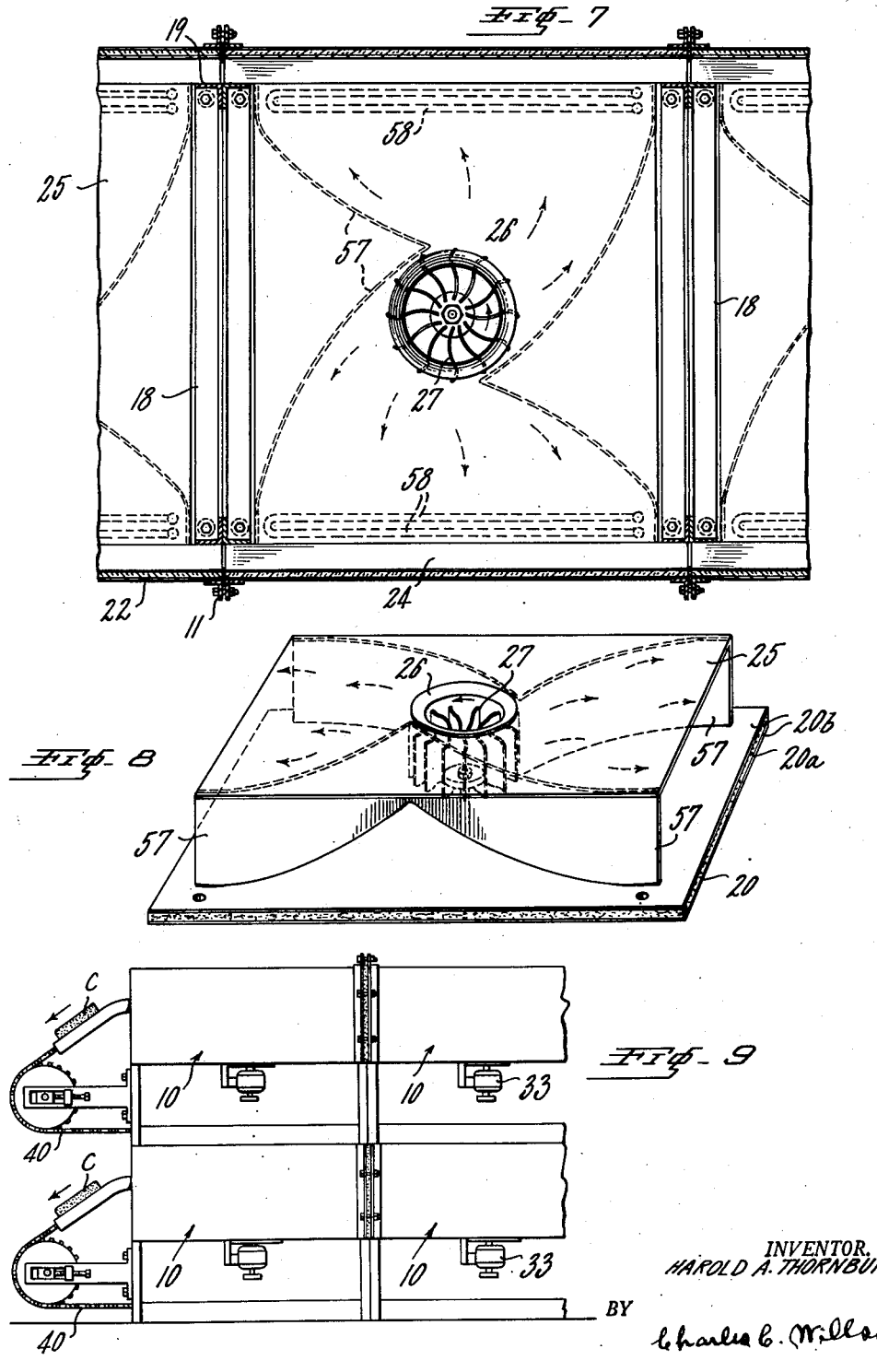

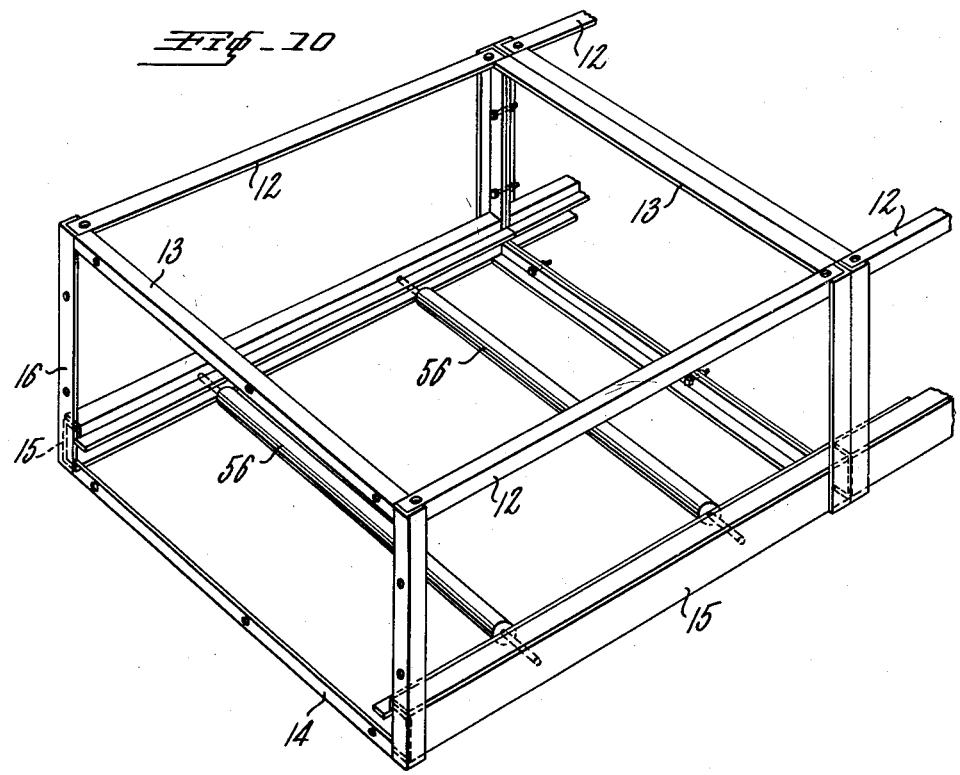
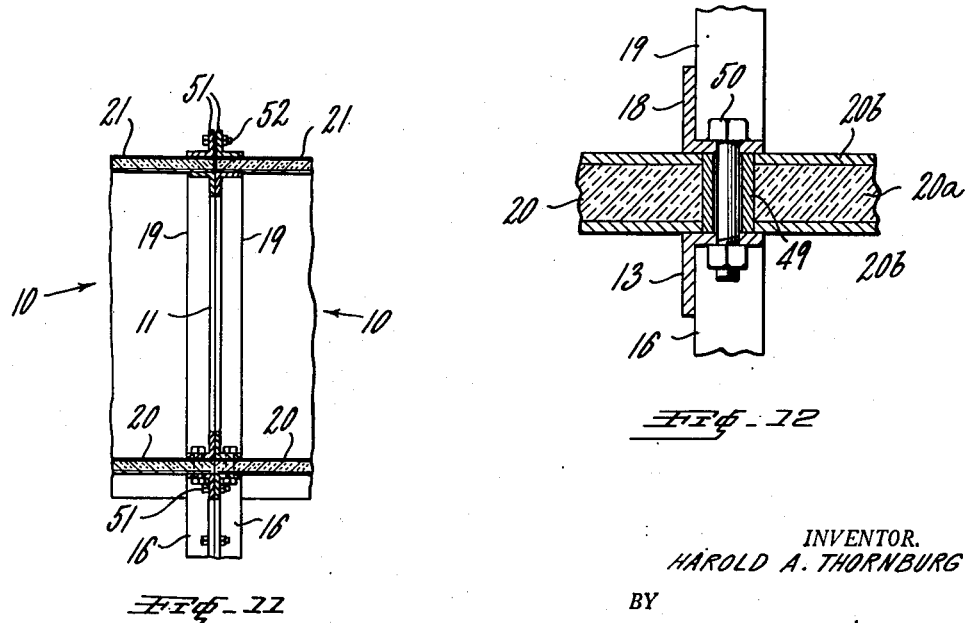

Patented Apr. 13, 1954

2,674,811

UNITED STATES PATENT OFFICE 2,674,811

DRIER FOR POROUS MATERIALS

Harold A. Thornburg, Brooklyn, N. Y., assignor to United States Rubber Company, New York, N. Y., a corporation of New Jersey Application November 17, 1950, Serial No. 196,129

10 Claims. (Cl. 34—213)

The present invention relates to driers that are adapted to dry various porous materials as they are advanced by a conveyor, and more particularly to a drier designed to remove moisture from shaped porous articles, such as molded latex foam articles before the latex foam is vulcanized.

Molded latex foam articles such as cushions, pillows and mattresses are now in extensive use. These latex foam articles are produced by causing latex to foam or froth and then introduce it into a mold where it is heated to produce a partially cured or pre-cured molded foam article. Such article is then washed to remove proteins and undesired chemicals from the latex foam or sponge. The molded article is then squeezed to remove as much water as can be readily removed in this manner, but the molded latex foam will retain about 60 to 75% water by weight after such squeezing operation. The drier contemplated by the present invention was designed primarily to remove quickly a substantial portion of this retained moisture.

This drying of molded latex foam or other porous articles or materials is accomplished, in accordance with the present invention, by providing a relatively long hot air drier and a screen or other type of open mesh conveyor through which air may pass freely. This conveyor extends lengthwise of the drier casing and is adapted to convey the material to be dried therethrough. Within this casing are provided a number of fans disposed lengthwise of the casing below the conveyor and they operate to circulate heated air by drawing the air downward through the porous material to be dried and through the conveyor, and then force it outwardly in opposite directions to pass upwardly around the side edges of the conveyor and down again through the material to be dried. In this manner each fan circulates the hot air repeatedly in its vicinity to pass down through the material to be dried so as to rapidly extract the moisture therefrom.

Since air will not remove moisture if it is very wet, means is provided for introducing fresh air at one end of the drier and for discharging the wet air at the opposite end of the drier, and dampers or other means are provided for controlling the amount of air taken in from the atmosphere at one end of the drier and discharged from the drier at its other end. The arrangement is such that this air travels in the opposite direction to the travel of the material being dried.

An important feature of the present invention resides in a hot air drier that operates as above described, and which comprises a relatively long drying casing that is formed of a number of similar drying units that are secured together in a row. Each unit is provided with its own power driven fan for circulating the air in the unit so that it will pass downwardly through the material to be dried and then outwardly towards the opposite sides of the unit and upwardly to pass again downwardly through such material. Each of these units has an upper chamber through which the conveyor for the material to be dried passes, and a lower chamber in which the fan operates, and these two chambers are separated by a horizontally extending partition having a central hole therein through which the air in the upper chamber is drawn downwardly by the fan in the lower chamber, and is then forced laterally outwardly to pass upwardly around the outer edges of this partition into the upper chamber for recirculation.

By forming the drying casing contemplated by the present invention of a number of similar units, the length of such casing may be varied as desired by bolting the required number of such units together in a row. All of these units may be identical in construction and operation, except that the first unit at the material receiving end of the drying casing and the last unit at the material discharge end of such casing are somewhat different in construction. The first and last units need not be provided with air heating means, but all the other units preferably are provided with air heating means, such for example as steam pipes placed in the path of the air that is discharged outwardly from the fan towards the sides of the casing.

In order to control to a high degree the movement of the circulating air in each unit as it passes downwardly through the material to be dried and the conveyor to the fan, and then outwardly to pass upwardly around the sides of the conveyor, curved guiding walls are provided that flare outwardly from the discharge sides of the fan so as to direct a stream of air forceably outwardly from each side of the fan into the vertical passages at the sides of the unit to move upwardly in these passages into the space above the material to be dried, and which is being advanced through the drier by the conveyor.

The hot air drier contemplated by the present invention, can as above stated, be built to any desired length by bolting together the desired number of drying units in a row, and the drying operation within the drying casing can be varied to a large degree by increasing or decreasing the speed of the conveyor travelling therethrough, by varying the speed of the fans which circulate the air in each unit, by regulating the temperature of the air in each unit, and by varying the amount of air that is introduced into the drying casing at one end thereof and discharged from the other end thereof. These various adjustments make the drier of the present invention well adapted to dry molded latex foam articles that may range in thickness from one to a number of inches, and make the hot air drier well adapted for use in drying other shaped porous articles, and porous materials which may be in the form of a continuous sheet, such for example as a sheet of loose fibers.

The above and other features of the hot air drier of the present invention will be further understood from the following description when read in connection with the accompanying drawings, wherein Fig. 1 is a top plan view of the hot air drier of the present invention, parts being broken away at several points along the drier and particularly at the mid area;

Fig. 2 is a side elevation of Fig. 1;

Fig. 3 on a larger scale is a section taken on line 3—3 of Fig. 1;

Fig. 4 on a still larger scale is a section taken on line 4—4 of Fig. 3 and shows hollow bars that support the upper run of the wire conveyor;

Fig. 4ᵃ is a view similar to Fig. 4 showing the action of the down pressure of the air upon the latex sponge;

Fig. 5 is a top plan view of part of the wire conveyor apron;

Fig. 6 is an enlarged section taken on the line 6—6 of Fig. 4 and shows an adjustable gate;

Fig. 7 is a horizontal sectional view taken through one of the units on the horizontal line 7—7 of Fig. 3, and shows the horizontal partition as having a central air hole therein;

Fig. 8 is a perspective view of a fan and of its associate partitions and guide walls for controlling the air discharged from its opposite sides;

Fig. 9 is a modification showing two similar drying units disposed one above the other to conserve floor space;

Fig. 10 is a perspective view of a skeleton metal frame provided to support each drying unit;

Fig. 11 is a detailed view showing the air tight joint provided between two drying units; and Fig. 12 is a sectional detailed view showing the construction employed to bolt an upper and lower skeleton frame together.

Each unit of the drier is shown as approximately square in top plan view. When bolted together as shown in Figs. 1 and 2 they form a drier that may be six or eight feet wide and a hundred feet or more long. Each unit is substantially complete in itself as it has its own fan and means for guiding the air so that it will circulate through the material to be dried, as indicated by the arrows in Fig. 3.

Each unit designated by the numeral 10, is shown as supported by a lower skeleton frame such as shown in Fig. 10, and which serves to support the hot air drying casing formed of the unit 10 the desired distance from the ground or floor F. A second skeleton frame which is approximately the same size and very similar in construction to that shown in Fig. 10 is provided. This second frame lies inside of the drying chamber of said unit and serves to form a rigid frame that supports the insulated walls of such unit. The units 10 are bolted together as indicated by 11 to form the long drier of Fig. 1.

The skeleton frame of Fig. 10 comprises the upper longitudinally extending angle bars 12, upper transverse angle bars 13, lower transverse angle bars 14, and lower longitudinally extending channel bars 15. The lower and upper bars of this frame are welded at their meeting ends to the uprights 16, to thereby form the rectangular skeleton frame shown.

The second or upper skeleton frame of a unit 10 may be similar to that shown in Fig. 10, except that it does not have the hollow channel bars 15. Such upper skeleton frame is provided with the upper transversely extending angle bars 17, and lower transversely extending angle bars 18, see Fig. 3, and these transverse bars are welded to longitudinally extending angle bars similar to those indicated by 12 in Fig. 10. The upper and lower angle bars just mentioned are welded to the upright angle bars 19 to form a skeleton frame that lies inside the unit 10.

In order to form a closed heating chamber about the upper skeleton frame just described, a lower insulating wall or floor 20 is clamped between the lower skeleton frame shown in Fig. 10, and the upper skeleton frame formed of the bars 17, 18, 19. This insulating floor 20, it should be noted, is wider than the upper skeleton frames just mentioned and projects outwardly some distance beyond the sides 19 of the skeleton frames as shown in Fig. 3. To the top of the upper skeleton frame is secured the top insulating wall 21 which is of the same width as the lower insulating floor 20 and therefore extends outwardly beyond the uprights 19. Between the laterally protruding portions of the bottom wall 20 and top wall 21 are secured the longitudinally extending insulated side walls 22 and 23. This construction serves to provide the narrow air passages 24 between the side walls 22 and 23 and the upright angle bars 19. The floor 20 is preferably formed of glass fibers 20ᵃ confined between the metal sheets 20ᵇ as best shown in Fig. 12.

The hot air drying unit of the present invention, and which is well shown in transverse section in Fig. 3 has an upper drying compartment and a lower fan compartment, and these compartments are separated one from the other by the horizontally extending partition 25 which is of a size and shape to fit snugly within the upper skeleton frame of the unit, and the corners of this partition are rigidly secured to and are supported by the uprights 19. This partition 25 is provided with a relatively large central hole in which is fitted the air directing ring 26 adapted to guide the air from the upper compartment downwardly to the fan 27. This fan is rotatably supported by an upright shaft 28 that is journaled in a supporting sleeve or shaft 29. The lower end of the fan shaft 28 is provided with a driving pulley 30. The fan 27 and its supporting means 28, 29 are secured to an insulating plate or disk 31 which is removably mounted in a circular opening in the floor 20 and it is secured in place by means of the cooperating metal rings 32. This construction is provided to allow the fan to be moved to and from the operating position in which it is shown in Fig. 3. The fan 27 is shown as driven by a motor 33 that is suspended from the metal structure of the lower frame shown in Fig. 10, and this motor drives the fan through the pulley 34 and belt 35.

Material to be dried in the unit of Fig. 3 is advanced therethrough by the upper run of an open-mesh metal conveyor having the upper run 36 and lower run 37, and it preferably has the heavy wire construction best shown in Fig. 5 and which is strong and durable. In order to relieve this wire conveyor from strains and to prevent it from working sideways out of its proper path of travel, the wire apron formed of the flat wire sections 38 connected by the transversely extending rods 39 is secured at frequent intervals to the roller bearing chains 40 disposed at each side of the hot air drier. The side chains 40 when supporting the upper run 36 of this wire conveyor travel upon the runways 41, and the rollers 42 of the chains 40 roll upon such runways. The runs of the side chains which support the lower length 37 of the conveyor apron travel upon the lower runways 43.

In order to prevent the upper run 36 of the conveyor apron from sagging under the weight of the cushions C, or other porous material it may carry, this upper run is supported at frequent intervals by the transversely extending channel bars 44, which are best shown in Fig. 4 and Fig. 4ª. These transverse bars 44 are spaced an inch or two apart throughout each unit 10 to support the weight of the upper run 36 of the conveyor. They also perform another important function in that they prevent the partly cured latex foam from being permanently compressed and reduced in thickness by the downward pressure exerted by the air being drawn through the latex foam as shown in Fig. 4ª. It has been found that if ordinary supporting bars are used transversely of the drier to support the upper run of the conveyor belt the thickness of the latex foam stock is reduced by the downward pressure of the air flowing to the fan. It has also been found that this reduction in thickness of stock can be prevented by employing hollow channel bars 44 constructed as shown in Fig. 4 and Fig. 4ª. These bars are spaced as shown and each has the hollow rectangular shape shown in cross section and each has a slot 44' in the upper face thereof through which air can pass into the hollow channel of the bar.

Fig. 4 shows how the molded latex foam article C appears when the fan is not operating to draw air downwardly through its porous mass, and Fig. 4ª shows how this latex foam mass is compressed by the downward pressure of the air travelling in the direction indicated by the arrows. It will be noted that in Fig. 4ª the cushion is compressed a substantial amount between the hollow supporting bars 44 but only very slightly immediately above such hollow bars. This is due to the fact that the downwardly flowing air which enters these hollow channels and is confined therein will exert an upward pressure upon the latex foam, and this will cause the foam to pulsate or breathe so that its upper surface will take the wavy contour shown in Fig. 4ª. It is found that this pulsation prevents reduction of the thickness of the foam mass during the drying operation. Also by this breathing action warmed air is sucked into the foam mass over the hollow bars where the air cannot pass through the material.

As the air passes downwardly between the spaced hollow bars 44 it is prevented from escaping adjacent the ends of such bars by the longitudinally extending plates 45 disposed at both sides of the drying chamber and cut out or notched to snugly embrace the bars 44. The ends of these hollow bars are normally closed by the gates 46 each of which is supported at its upper end by the hinges 47. If desired these gates may be moved to the open position shown in Fig. 6 by operating the hand pull wire 48. When a gate 46 is open air will pass from the fan into the end of the channel as indicated by the arrows in Fig. 6 to pass up against the bottom of the foam mass to the extent desired.

The insulated floor 20, as stated above, lies between the top of the lower skeleton frame shown in Fig. 10 and the bottom of a similar skeleton frame positioned inside of the drying chamber of the unit 10. The way in which the upper and lower skeleton frames are rigidly secured together is best shown in Fig. 12 wherein the floor 20, which is preferably formed of the insulating material 20ª, confined between the metal plates 20ᵇ, has embedded therein the metal sleeves 49. One end of these sleeves rests upon the angle bar 13 of the lower frame and the upper end supports the weight of the angle bar 18 of the upper frame. These two frames are rigidly secured together at a desired number of points by the clamping bolts 50 that extend through the sleeves 49.

As above stated the hot air drier contemplated by the present invention is preferably formed of a number of similar units 10 that are secured together in a row to produce a drier of the desired length. The manner in which two of these units 10 are clamped together is best shown in Fig. 11, wherein two units 10 having the bottom walls 20 and top walls 21 are shown as provided with the angle bars 51 secured at their outer faces, and these angle bars are bolted together by the bolts 52. In order to secure an air tight joint between the units 10 suitable packing material is preferably introduced between the adjacent ends of the walls 20 and 21.

Having described in detail the construction of a single unit 10, the construction and operation of the complete hot air drier formed by such units will now be described, and in this connection attention is directed to Figs. 1 and 2 of the drawings, wherein a hot air drier of any desired number of the units 10 is shown. Each of these units is constructed as above described and has the bottom wall 20, top wall 21 and the fan 27 disposed centrally of the unit. The wire conveyor above described as having the upper run 36 and lower run 37 travels in the direction indicated by the arrows in Figs. 1 and 2, and on the upper run 36 are deposited the molded latex foam cushions C or other porous material to be dried. The endless chains 40 which support and drive the conveyor pass around the sprockets 53 at the material receiving end of the drier and around the sprockets 53' at the material discharge end of the drier, and these sprockets are rotatably supported as shown. The sprockets 53 are driven at the desired speed by an electric motor 54 which drives variable speed gears within the variable speed gear box 55. The runways 41 for the upper run of the conveyor are bent downwardly at each end of the machine as shown to accommodate the angle at which the conveyor apron and supporting chains approach and leave this upper level. The weight of the upper run of the conveyor is supported largely by the transversely extending channel bars 44. The weight of the lower run of such conveyor is preferably supported at spaced points by the transversely extending rollers 56 that are rotatably supported by the channel bars 15 as shown in Fig. 10.

The apparatus of the present invention serves to dry the porous material at high speed due to the construction whereby the fans 27 are provided at frequent intervals lengthwise of the drier and operate to circulate the air in such a manner that it will be drawn repeatedly down through the material to be dried with an air pressure of from ¼ inch to several inches water column. This air is forced outwardly and upwardly through the side passages 24 to a position above the material to be dried, so that it will again be drawn downwardly through such porous material. In order to control accurately the path of such circulating air, provide better distribution and increase the efficiency, the fan 27 has extending outwardly therefrom as best shown in Fig. 8 the curved or scroll walls 57 which guide the air from the fan outwardly, as indicated by the arrows in Figs. 7 and 8 into the vertical channels 24. As such air approaches these channels it is heated by passing around the steam coils 58 or other suitable heating means. Steam is supplied to these heating coils at the desired temperature by means not shown. These heating coils are not shown in Fig. 3 as this is a cooling unit which does not have such coils.

Since the molded latex sponge articles passing through the hot air drier contain considerable moisture, the air used to dry such latex foam will become laden with moisture. It is therefore important to continuously discharge part of the drying air at one end of the drying machine, and to take in air from the atmosphere at the other end of such machine. In accordance with the present invention air from the atmosphere is drawn into the drier by the suction of the fans through the filters 59, which may be formed of sheets of fiber glass and are preferably mounted in the top of the unit 10 disposed at the material discharge end of the drying machine. The air that is drawn into the drier through these filters serves to cool the hot foam material C. If more air is drawn in through these filters than it is desired to advance lengthwise of the drier, some of this air after passing through the hot material C may be discharged through the sliding windows 60 provided in the side walls of this cooling unit. The air not discharged through these windows may travel lengthwise of the drier above the material being dried, and lengthwise within the passages 24, and the amount of air that travels in these passages is controlled by adjusting the dampers 61 located between this cooling unit 10 and the unit secured thereto. These dampers may be adjusted by the operating handles 61'.

The air which is introduced through the filters 59 is drawn by the fans 27 repeatedly through the material to be dried, and is gradually advanced towards the material intake end of the machine by the various fans. This air becomes more and more laden with moisture, and picks up moisture very fast in the first unit 10 at the material receiving end of the machine, due to the large amount of moisture within the cushion C at this end of the machine. This water laden air may be discharged from this first unit as rapidly as desired by adjusting the windows 62 in this unit. The passages 24 may have mounted therein in the lower portions thereof the fixed baffles 63 that are disposed directly below the dampers 61 and provided between the cooling unit 10 and the unit secured thereto.

In operating the apparatus of the present invention it is not desirable to supply heat to the unit at the material discharge or cooling end of the machine, since the substantially dried cushions C will be hot when they reach this unit and the air pulled in through the filters 59 will serve to cool these cushions. It may or may not be desirable to heat the air in the unit at the opposite or material receiving end of the machine since this air is very wet and is to be discharged through the windows 62, and control at this point will affect the economy of the drying operation. If very thin stock is being dried on the conveyor 36 it may be desirable to provide partitions between the various units 10 to extend downwardly from the top of the drier towards the conveyor, but such partitions are not needed when relatively thick stock is dried.

The modification of Fig. 9 differs from the drier shown in Fig. 2 in that, the construction of Fig. 9 is a double deck drier in which a second drier such as shown in Fig. 2 is mounted on top of the first drier to conserve floor space. The two driers operate independently and one or both may be used as desired.

The hot air drier of the present invention will remove moisture rapidly from thick porous material being advanced therethrough by the wire conveyor apron. This is due largely to the construction whereby the air circulated by each fan 27 is well controlled and is drawn repeatedly down through the porous material to be dried as such material passes from one fan to another. Furthermore by constructing the hot air drier of a number of similar drying units the length of the drier can be varied as desired. Also parallel units can be mounted above each other and mass production methods can be used in constructing such units.

Having thus described my invention, what I claim and desire to protect by Letters Patent is:

1. A hot air drier, comprising a drying casing, an endless conveyor through which air can pass and having a run extending through said casing to convey material therethrough, a horizontal partition below said run and having a central hole therein, a fan having its intake adjacent said hole, means forming a narrow air passage extending along each side of the conveyor for conducting air to the area above said run, walls having their surfaces substantially parallel to the outlet axis of said fan extending outwardly from opposite sides of the fan, said walls at their portions near the fan being closely adjacent the fan and said walls diverging from one another outwardly towards the side of the drying casing for guiding air discharged from the opposite sides of the fan into the narrow passages, and means for operating the fan to force air in a circuit up through said passages and draw it down through the material on the conveyor to the fan intake.

2. A hot air drier, comprising a drying casing, an endless conveyor through which air can pass and having a run extending through said casing to convey material therethrough, a horizontal partition below said run and having a central hole therein, a fan having its intake adjacent said hole, means forming a narrow air passage extending along each side of the conveyor for conducting air to the area above said run, walls having their surfaces substantially parallel to the outlet axis of said fan extending outwardly from opposite sides of the fan, said walls at their portions near said fan being closely adjacent the fan and said walls diverging from one another outwardly towards the sides of the drying casing for guiding air discharged from the opposite sides of the fan into the narrow passages, means for operating the fan to force air in a circuit up through said passages and draw it down through the material on the conveyor to the fan intake, and heating means for heating the air as it leaves the fan.

3. A hot air drier, comprising a drying casing formed of a number of drying units secured together in a row, an endless conveyor through which air can pass and having a run extending lengthwise through the casing to convey material therethrough, a horizontal partition mounted in each unit below the conveyor run and each partition having a central hole therein, a fan for each unit having its intake adjacent said hole, means forming a vertical air passage in each unit at both sides of the conveyor for conducting air to the area above said run, walls for each of said fans having their surfaces substantially parallel to the outlet axis of said fan extending outwardly from opposite sides of the fan, said walls at their portions near said fan being closely adjacent the fan and said walls diverging from one another outwardly towards the sides of the drying casing for guiding air discharged from the fan into said vertical passages, and means for operating the fans to circulate air up through the vertical passages and down through the material on the conveyor.

4. A hot air drier, comprising a drying casing formed of a number of drying units secured together in a row, an endless conveyor through which air can pass and having a run extending lengthwise through the casing to convey material therethrough, a horizontal partition mounted in each unit below the conveyor run and each partition having a central hole therein, a fan for each unit having its intake adjacent said hole, means forming an air passage in each unit that extends along each side of the conveyor and adapted to conduct air to the area above said run, walls for each of said fans having their surfaces substantially parallel to the outlet axis of said fan extending outwardly from opposite sides of the fan, said walls at their portions near said fan being closely adjacent the fan and said walls diverging from one another outwardly towards the sides of the drying casing for guiding air discharged from the fan into said passages, means for operating the fans to circulate air up through the passages and down through the material on the conveyor, and said passages opening one into another to pass air lengthwise of the drying casing.

5. A hot air drier, comprising a drying casing formed of a number of drying units secured together in a row, an endless conveyor through which air can pass and having a run extending lengthwise through the casing to convey material therethrough, a horizontal partition mounted in each unit below the conveyor run and each partition having a central hole therein, a fan for each unit having its intake adjacent said hole, means forming a narrow air passage in each unit that extends along each side of the conveyor and adapted to conduct air to the area above said run, walls for each of said fans having their surfaces substantially parallel to the outlet axis of said fan extending outwardly from opposite sides of the fan, said walls at their portions near said fan being closely adjacent the fan and said walls diverging from one another outwardly towards the sides of the drying casing for guiding air discharged from the fan into said passages, means for operating the fans to circulate air up through the passage and down through the material on the conveyor, and means for heating the air as it leaves the fans.

6. A hot air drier for removing moisture from shaped porous articles comprising a drying casing, an endless conveyor through which air can pass and having a run extending through said casing to convey material therethrough, supporting means for said conveyor, said supporting means being formed of a plurality of hollow members extending transversely of said conveyor therebeneath and being spaced from one another in the direction of travel of said conveyor through said drier, said hollow members having openings in their upper surface and having their ends open, a horizontal partition below said members having a central hole therein, means forming a narrow air passage extending along each side of the conveyor for conducting air to the area over said run, closures for the open ends of said members adjustably openable to by-pass a portion of the air from said air passage through said memebers and the openings therein to the underside of said conveyor, a fan having its intake adjacent the hole in said horizontal partition, said fan having oppositely extending diverging walls for guiding air discharged from the opposite sides of the fan into the narrow passages, and means for operating the fan to force air in a circuit up said passages and draw it through the material on the conveyor to the fan intake.

7. A hot air drier, comprising a drying casing, an endless conveyor through which air can pass and having a run extending through said casing to convey material therethrough, supporting means for said conveyor, said supporting means being formed of a plurality of hollow bars extending transversely of said conveyor therebeneath and being spaced from one another in the direction of travel of said conveyor through said drier, said hollow bars having slots in their upper surfaces and having their ends open, a horizontal partition below said bars having a central hole therein, means forming a narrow air passage extending along each side of the conveyor for conducting air to the area over said run, a plate at each side of said conveyor adapted to close the open ends of said bars, said plates being adjustable to vary the openings in the ends of said bars and to by-pass air from said air passage through said bars and the slots therein to the underside of said conveyor, a fan having its intake adjacent the hole in said horizontal partitions, walls having their surfaces substantially parallel to the outlet axis of said fan extending outwardly from opposite sides of the fan, said walls at their portions near said fan being closely adjacent the fan and said walls diverging from one another outwardly toward the sides of the drying casing for guiding air discharged from the opposite sides of the fan into the narrow passages, means for operating the fan to force air up said passages, and heating means for heating the air as it leaves said fan.

8. A hot air drier, comprising a drying casing formed of a number of drying units secured together in a row, an endless conveyor through which air can pass and having a run extending lengthwise through the casing to convey material therethrough, supporting means in each unit for said conveyor, said supporting means being formed of a plurality of hollow members extending transversely of said conveyor therebeneath and being spaced from one another in the direction of travel of said conveyor through said unit, said hollow members having openings in their upper surfaces and having their ends open, a horizontal partition mounted in each unit below said members and each partition having a central hole therein, means forming an air passage in each unit that extends along each side of the conveyor and adapted to conduct air to the area above said run, closures for the open ends of said members in each of said units adjustably openable to bypass a portion of the air from said passage through said members and the openings therein to the underside of said conveyor, a fan for each unit having its intake adjacent the hole in said horizontal partitions each fan having oppositely extending diverging walls for guiding air discharged from the fan into said passages, means for operating the fans to circulate air up the passages and down through the material on the conveyor, and said passages opening one into another to pass air lengthwise of the drying casing.

9. A hot air drier for removing moisture from shaped porous articles, comprising a drying casing formed of a number of drying units secured together in a row, an endless conveyor through which air can pass and having a run extending lengthwise through the casing to convey material therethrough, supporting means in each of said units for said conveyor, said supporting means being formed of a plurality of hollow bars extending transversely of said conveyor therebeneath and being spaced from one another in the direction of travel of said conveyor through said drier, said hollow bars having slots in their upper surfaces and having their ends open, a horizontal partition mounted in each unit below the conveyor run and each partition having a central hole therein, means forming a vertical air passage in each unit at both sides of the conveyor for conducting air to the area above said run, a plate on each side of said conveyor run adapted to form a closure for the open ends of said bars, said plate being movable to adjustably open the ends of said bars to by-pass a portion of the air from said air passage through said bars and the slots therein to the underside of said conveyor, a fan for each unit having its intake adjacent the hole in the horizontal partition, walls for each of said fans having their surfaces substantially parallel to the outward axis of said fan extending outwardly from opposite sides of the fan, said walls at their portions near said fan being closely adjacent the fan and said walls diverging from one another outwardly towards the sides of the drying casing for guiding air discharged from the fan into said vertical passages, and a means for operating the fans to force air up the vertical passages and draw it down through the material on the conveyor.

10. A hot air drier, comprising a drying casing formed of a number of drying units secured together in a row, an endless conveyor through which air can pass and having a run extending through said casing to convey material therethrough, supporting means in each of said units for said conveyor, said supporting means being formed of a plurality of hollow bars extending transversely of said conveyor therebeneath and being spaced from one another in the direction of travel of said conveyor through said drier, said hollow bars having slots in their upper surfaces and having their ends open, a horizontal partition mounted in each unit below said bars and each partition having a central hole therein, means forming a narrow air passage extending along each side of the conveyor for conducting air to the area over said run, a plate mounted at each side of the conveyor in each of said units hinged adjacent said bars and adapted to close the ends of said bars, said plates being adjustable to open the ends of said bars to by-pass air from said air passage through said bars and the slots therein to the underside of said conveyor, a fan for each of said units having its intake adjacent the hole in said horizontal partition, walls for each of said fans having their surfaces substantially parallel to the outlet axis of said fan extending outwardly from opposite sides of the fan, said walls at their portions near said fan being closely adjacent the fan and said walls diverging from one another outwardly toward the sides of the drying casing for guiding air discharged from the fan into said passages, means for operating the fans to circulate air up the passages and down through the material on the conveyor, and means for heating the air as it leaves the fans.

References Cited in the file of this patent

UNITED STATES PATENTS

| Number | Name | Date |
| --- | --- | --- |
| 473,263 | Proctor | Apr. 19, 1892 |
| 1,198,169 | Turner | Sept. 12, 1916 |
| 1,547,294 | Braemer | July 28, 1925 |
| 1,761,016 | Koehring et al. | June 3, 1930 |
| 1,906,799 | Lobley | May 2, 1933 |
| 1,919,057 | Furbush | July 18, 1933 |
| 1,965,229 | Galson | July 3, 1934 |
| 1,966,405 | Galson et al. | July 10, 1934 |
| 1,983,264 | Belcher | Dec. 4, 1934 |
| 2,039,429 | Lydon | May 5, 1936 |
| 2,280,704 | Hurxthal | Apr. 21, 1942 |
| 2,330,938 | Williams | Oct. 15, 1943 |
| 2,336,698 | Morrill | Dec. 14, 1943 |